United States Patent Office 3,451,942
Patented June 24, 1969

3,451,942
CATALYST-REJUVENATION PROCESS
Ralph J. Bertolacini, Chesterton, Ind., assignor to Standard Oil Company, Chicago, Ill., a corporation of Indiana
No Drawing. Filed Dec. 6, 1965, Ser. No. 512,572
Int. Cl. B01j *11/02*
U.S. Cl. 252—411                     8 Claims

ABSTRACT OF THE DISCLOSURE

The process is for the rejuvenation of a catalyst comprising a hydrogenation-dehydrogenation component and an acid-acting inorganic oxide support wherein the crystallites of the hydrogenation-dehydrogenation component have become enlarged through use for the conversion of hydrocarbons. After a major portion of the accumulated coke has been removed from the catalyst, it is subjected to the rejuvenation process. The process comprises: treating the catalyst with a nitrogen-oxide-affording material under conditions that will cause the material to react with the hydrogenation-dehydrogenation component; treating the catalyst with an oxygen-containing gas under conditions that will cause the oxygen to react with the hydrogenation-dehydrogenation component; and treating the catalyst with a hydrogen-containing gas under conditions to reduce the hydrogenation-dehydrogenation component. The nitrogen-oxide-affording material may be concentrated nitric acid or a gas containing at least one member selected from the group consisting of NO, $NO_2$, $N_2O$, and $N_2O_3$. An arsenided-nickel-on-fluorided-silica-alumina hydrocracking catalyst may be rejuvenated advantageously by this process.

---

This invention relates to the treatment of deactivated catalysts. Particularly, it relates to a novel processing scheme for the rejuvenation of catalysts which have been used in the conversion of relatively high-boiling hydrocarbon feed stocks to produce lower boiling hydrocarbons which boil predominantly in the gasoline boiling range. More particularly, it relates to a novel processing scheme for the rejuvenation of catalysts which have been used in the hydrocracking of hydrocarbon feed stocks.

Many modern-day petroleum refineries are geared to produce maximum amounts of gasoline. Various processes must be used in the typical refinery to convert the various hydrocarbon feed stocks into products which may be suitably included in high-octane gasoline products. Among those feed stocks which are employed are such high-boiling feed stocks as cycle oils, which are quite refractory and which have very high boiling points. Such feed stocks may be catalytically cracked in the presence of hydrogen, that is, hydrocracked, to yield products which possess high octane numbers and which boil, for the most part, in the gasoline boiling range. In hydrocracking, relatively high-molecular-weight hydrocarbons are converted to lower-molecular-weight hydrocarbons at elevated temperature and pressure in the presence of a hydrocracking catalyst and a hydrogen-containing gas. Hydrogen is consumed during hydrocracking. In the usual hydrocracking process, a hydrocarbon feed stock, such as a gas oil that boils in the range of about 350° F. to about 1000° F., is converted to lower-molecular-weight products, such as gasoline-boiling-range products and light distillates.

One type of low-temperature hydrocracking process for maximum gasoline-boiling-range products employs two processing stages. In the first stage, the feed stock is hydrotreated to remove the basic nitrogen and sulfur that are typically found in the usual refinery feed stocks. In the second stage, the pretreated hydrocarbon stream is converted to lower-boiling products. Consequently, the first stage is a feed-preparation stage and the second stage is a hydrocracking stage.

A suitable hydrocracking catalyst for the conversion of hydrocarbons under hydrocracking conditions comprises a hydrogenation-dehydrogenation component and an acid-acting inorganic-oxide support.

The hydrogenation-dehydrogenation component of such a catalyst may be present in one of several forms: small crystallites of the metal component, the oxide of the metal, or as large crystallites of a compound of the metal, such as the sulfide of the metal. Apparently, if the crystallites are small, the catalyst will possess a relatively high activity. On the other hand, if the crystallites are large, the catalyst will possess a very poor activity. Of course, the line or range of demarcation between an active and a relatively inactive catalyst would be dictated by the nature of the catalyst and the type of hydrogenation-dehydrogenation component.

When a hydrocracking catalyst comprising a hydrogenation-dehydrogenation component and an acid-acting inorganic-oxide support is fresh and the hydrogenation-dehydrogenation component is present in the form of very small crystallites, the catalyst will be found to be relatively active. As the catalyst is used to convert hydrocarbons under suitable conditions, the sulfide of the hydrogenation-dehydrogenation component may form and the crystallites will begin to grow. Crystallite growth may be promoted by the severe conditions of the refining operation. At some point, the enlarged crystallites will be associated with a very low activity. Such low activity value will be the result of a number of factors. Among these are deposition of coke on the catalyst, loss of surface area, deposition of permanent poisons on the catalyst, enlarged crystallites of the hydrogenation-dehydrogenation component or a compound thereof, and phase changes in the support. A mere regeneration of the used catalyst to burn the coke therefrom will not restore the catalyst activity. It has been found unexpectedly, however, that if the catalyst is exposed to a rejuvenation treatment which is instrumental in reducing sufficiently the sizes of the crystallites of the hydrogenation-dehydrogenation component, the catalyst so treated will present an activity which approaches that of the fresh material. It is very unlikely that fresh-catalyst activity will be achieved, since some permanent activity loss may result from the loss of surface area, the deposition of permanent poisons, and possible phase changes of the support. A rejuvenation treatment for a catalyst, as considered herein, is one in which the activity of the catalyst is restored substantially to initial activity as a result of changes in the physical and/or chemical properties of the catalyst brought about by the treatment. It is more than a mere coke-removal operation.

Briefly, my invention involves the rejuvenation of a catalyst which comprises a hydrogenation-dehydrogenation component and an acid-acting inorganic-oxide support, which catalyst has been used for the conversion of hydrocarbons until the crystallites of the hydrogenation-dehydrogenation component have grown to a size which renders said catalyst substanially ineffective for the conversion of hydrocarbons and which catalyst has had a major portion of the coke removed therefrom, which rejuvenation comprises in sequence: treating the catalyst with a nitrogen-oxide-affording material at conditions effective to cause said material to react with the hydrogenation-dehydrogenation component; treating the catalyst with an oxygen-containing gas at conditions effective to cause the oxygen of said oxygen-containing gas to react with the hydrogenation-dehydrogenation component; and treating the catalyst with a hydrogen-containing gas at conditions effective to cause the hydrogen of said hydrogen-containing gas to reduce the hydrogenation-dehydrogenation component. As a result of my rejuvenation treatment, which has advantages over other catalyst-rejuvenation treatments, the crystallites of the hydrogenation-dehydrogenation component are reduced to a size that is conducive to good catalytic activity for the conversion of hydrocarbons.

In one embodiment of my invention, the nitrogen-oxide-affording material is a gas containing at least one member selected from the group consisting of NO, $NO_2$, $N_2O$, and $N_2O_3$. In another embodiment of my invention, the nitrogen-oxide-affording material is an aqueous concentrated nitric acid solution. When nitric acid is used, only enough of the nitric acid is used to fill the available pore volume of the catalyst. Care should be taken so that an excess of the acid is not used. An excess of acid could deleteriously attack the catalyst. The concentrated nitric acid solution is maintained at a concentration within the range of 11 normal to 16 normal nitric acid.

It is hypothesized that the treatment with the nitrogen-oxide-affording material converts the hydrogenation-dehydrogenation component into a salt, perhaps the nitrate. The subsequent treatment in the oxygen-containing gas may convert the hydrogenation-dehydrogenation component into the ionic form. The reduction of the hydrogenation-dehydrogenation component in the hydrogen-containing gas converts the hydrogenation-dehydrogenation component into small crystallites. Such a hypothesis is presented only to describe what might be occurring as the catalyst is being processed by the rejuvenation treatment and is not intended to limit the mechanism, or mechanisms, which might occur in fact.

My invention, which may be satisfactorily employed to reactivate a deactivated catalyst which has the hydrogenation-dehydrogenation component present in the form of large crystallites and which has previously had its coke removed by an appropriate regeneration procedure, will be more easily understood through the reading of the following discussion and examples.

The hydrocracking of hydrocarbons may be carried out by contacting the hydrocarbon feed stock with a suitable hydrocracking catalyst in the presence of hydrogen at elevated temperatures and pressures. Typical hydrocracking catalysts comprise a hydrogenation-dehydrogenation component and a solid acid-acting cracking component. Acid-acting inorganic oxides are suitable solid acid-acting cracking components. The hydrogenation-dehydrogenation component may exist in the metallic form or as a compound such as the oxide or sulfide thereof. The metallic hydrogenation-dehydrogenation component may be selected from the metals of Group VIII and the metals of Group VI–B of the Periodic Table; molybdenum and tungsten are examples of metals of Group VI–B; nickel and platinum are examples of the metals of Group VIII. The selected hydrogenation-dehydrogenation component can be introduced into the catalyst by impregnating the acid-acting inorganic-oxide with a heat-decomposible compound of the hydrogenation-dehydrogenation component and calcining the resulting composite.

The acidic cracking component of the hydrocracking catalyst may be made up of one or more of suitable acid-acting inorganic oxides, such as silica-alumina, silica-alumina-zirconia, silica-magnesia, acid-treated aluminas, with or without halogens, such as fluorided-alumina, boria-alumina, various heteropoly acid-treated aluminas, molecular-sieve-containing aluminas, and other similar components.

An improved hydrocracking catalyst also includes an activity-control-affording material, which balances the activities of the various catalytic elements so that there results a low rate for hydrogenation relative to that for isomerization. When the activities in the catalyst are balanced, more branched paraffins and a better product distribution result. The normally solid elements of Group VI–A, particularly sulfur, and the normally solid elements of Group V–A of the Periodic Table, particularly arsenic and antimony, and metals such as lead, mercury, copper, zinc, and cadmium can provide an advantageous balance in activities between the metallic hydrogenation-dehydrogenation component and the solid acid-acting cracking component. Such activity-control-affording elements may be introduced into the catalyst during the catalyst manufacture by impregnating a composite of a hydrogenation-dehydrogenation component on a solid acidic component with a solution of an organic or inorganic compound, for example, triphenylarsine, mercuric nitrate, and arsenic trioxide. Of course, the composite of hydrogenation component on acidic cracking component could be treated with a sulfur compound, such as hydrogen sulfide or carbon disulfide. Only small amounts of these activity-control-affording elements are required in the catalyst. Therefore, in the case of arsenic or antimony, only about 0.1 to 5 mols of arsenic or antimony, preferably about 0.1 to 1 mol, and optimally about 0.25 to 0.75 mol, of these elements are used per mol of the hydrogenation-dehydrogenation metal. Not only will the use of these activity-control-affording elements result in an increase of branched-chain paraffins, but also catalyst regeneration is facilitated.

An example of a catalyst which comprises the above components is an arsenided-nickel-on-fluorided-silica-alumina catalyst. Such a catalyst has been shown by the prior art to have a good hydrocracking activity. As pointed out above, the catalyst after an extended period of time on oil will possess heavy coke deposits and enlarged crystallites, as well as some loss of surface area, possible phase changes in the support, and some deposition of permanent poisons. The coke deposits may be removed by suitable regeneration techniques. This removal of coke will not reactivate the catalyst. However, the catalyst may be reactivated successfully by my catalyst-rejuvenation process.

My rejuvenation process would be performed after the coke deposited upon the catalyst had been removed by a suitable regeneration treatment. If the process which employs a gas containing an oxide of nitrogen is selected, the coke-free catalyst is subjected first to a gas which comprises at least one oxide of nitrogen. This oxide of nitrogen is selected from the following nitrogen oxides: NO, $NO_2$, $N_2O$, and $N_2O_3$. The concentration of the nitrogen oxide in the gas is at least 25 volume percent. This part of my rejuvenation process is carried out at a temperature of at least 500° F., suitably at a temperature within the range of about 500° to about 1100° F., preferably at a temperature within the range of about 700° to about 900° F., at a pressure of at least 0.5 atmosphere, suitably at a pressure within the range of about 1 to about 10 atmospheres, and preferably at a pressure within the range of about 1 to about 3 atmospheres; at a gas flow rate of at least 0.25 cubic foot per hour, suitably at a gas flow rate within the range of about 0.25 to about 5.0 cubic feet per hour, and preferably at a gas flow rate within the range of about 0.5 to about 2.0 cubic feet per hour; and for a period of time of at least 0.5 hour, suitably for a period of time within the range of about 1 to about 16 hours, and preferably for a period of time within the range of about 4 to about 16 hours. The concentration, temperature, pressure, gas flow rate, and period of time, all are selected to effectively cause the oxide of nitrogen to react with the hydrogenation-dehydrogenation component of the catalyst.

If the rejuvenation treatment which employs concentrated nitric acid is selected to reactivate the catalyst, the following procedure is used. After the coke has been removed from the catalyst, the catalyst is treated with just enough concentrated nitric acid to wet the catalyst, that is, to fill the pore volume of the catalyst. An excess of the acid is avoided, since it could deleteriously attack the catalyst. This portion of the treatment is carried out at a temperature within the range of about 45° to about 160° F. and at a pressure within the range of about 1 to about 5 atmospheres for a time sufficient to permit the nitric acid to fill the available pore volume of the catalyst. Then the catalyst is dried at a temperature of at least 200° F., suitably at a temperature within the range of about 200° to about 300° F., and a pressure of at least 1 atmosphere, suitably at a pressure within the range of about 1 to about 5 atmospheres, for a period of time of at least 2 hours, suitably for a period of time within the range of about 2 to about 16 hours.

That portion of my process wherein the catalyst is treated with an oxygen-containing gas comprises treating the catalyst with a gas containing oxygen at a concentration of at least 2 volume percent at a temperature of at least 500° F., suitably at a temperature within the range of about 500° to about 1100° F., and preferably at a temperature within the range of about 900° to about 1100° F.; at a pressure of at least 0.5 atmosphere, suitably at a pressure within the range of about 1 to about 80 atmospheres, and preferably at a pressure within the range of about 1 to about 40 atmospheres; and at an oxygen flow rate of at least 0.25 cubic foot per hour, suitably at an oxygen flow rate within the range of about 0.25 to about 5.0 cubic feet per hour, and preferably at an oxygen flow rate of about 0.5 to about 3.0 cubic feet per hour; for a period of time of at least 0.5 hour, suitably for a period of time within the range of about 1 to about 10 hours, and preferably for a period of time within the range of about 1 to about 6 hours. The oxygen concentration, temperature, pressure, oxygen flow rate, and period of time, all are selected to effectively cause the oxygen to react with the hydrogenation-dehydrogenation component of the catalyst.

That portion of my process wherein the catalyst is treated with a hydrogen-containing gas comprises treating the catalyst with a gas containing hydrogen at a concentration of at least 60 volume percent, at a temperature of at least 400° F., suitably at a temperature within the range of about 400° to about 1000° F., and preferably at a temperature within the range of about 700° to about 900° F.; at a pressure of at least 69 atmospheres, suitably at a pressure within the range of about 80 to about 110 atmospheres, and preferably at a pressure within the range of about 90 to about 103 atmospheres; and a hydrogen flow rate of at least 0.25 cubic foot per hour, suitably at a hydrogen flow rate within the range of about 0.25 to about 5.0 cubic feet per hour, and preferably at a hydrogen flow rate within the range of about 0.5 to about 2.0 cubic feet per hour; for a period of time of at least 0.5 hour, suitably for a period of time within the range of about 1 to about 10 hours, and preferably for a period of time within the range of about 1 to about 6 hours. The hydrogen concentration, temperature, pressure, hydrogen flow rate, and period of time, all are selected to effectively cause the hydrogen to react with the hydrogenation-dehydrogenation component of the catalyst.

The following examples consider an arsenided-nickel-on-fluorided-silica-alumina hydrocracking catalyst. The original catalyst was found to have a surface area of 320 m.$^2$/gm. and contain 2.5% fluorine and 2.6% arsenic. The catalyst was removed from the hydrocracking stage of a conventional two-stage hydrocracking process. It had been on stream for 3,278 hours. At this time, the catalyst possessed a surface area of 170–185 m.$^2$/gm. and contained 3–4% fluorine and 9.9% carbon. The nickel crystallites were found to be ferromagnetic and have a size ranging from 500 to 1000 A. Minimal catalyst activity was available. The rejuvenation treatment described in Example I is a preferred embodiment of my invention.

Example I

The catalyst was first regenerated. During this regeneration treatment, a major portion of the coke was burned off of the catalyst. The catalyst was heated in flowing air (about one cubic foot per hour) from room temperature to 700° F. and then held at this latter temperature for one hour. Then the temperature was raised to 1000° F. and the catalyst was maintained in flowing air at this temperature for four hours. This regeneration treatment was performed in a furnace at atmospheric pressure.

The above regenerated catalyst was divided into several portions. For rejuvenation, one of these portions was treated with NO$_2$ obtained from a cylinder distributed by the Matheson Chemical Company. This gas was 99.5% NO$_2$. The treatment was conducted at 800° F. for a period of 16 hours at a gas rate of about one cubic foot per hour. Then the catalyst was calcined in air at 1000° F. for four hours and subsequently treated with hydrogen for one hour at 83 atmospheres and 750° F. The air was introduced into the treating zone at the rate of one cubic foot per hour; the hydrogen, at about 1 cubic foot per hour. After the above sequence of treatments, the catalyst was found to have nickel crystallites which were smaller than those that can be measured accurately by X-ray-diffraction techniques. In other words, the nickel-crystallite size was smaller than 35 A. The catalyst was then treated under hydrocracking conditions to obtain its hydrocracking activity. The nominal conditions employed included a catalyst temperature of approximately 590–593° F., a pressure of about 83 atmospheres, a weight hourly space velocity of 3.5, and a once-through hydrogen rate of approximately 10,000 standard cubic feet of hydrogen per barrel of hydrocarbon used.

The hydrocracking tests were performed with a heavy catalytic cycle oil which had been denitrogenated over a nickel-tungsten-sulfide catalyst. The feed stock contained 0.3 p.p.m. nitrogen, possessed a refractive index of 1.4871 and a gravity of 29.8° API.

This rejuvenated catalyst was found to have after 27 hours on oil an activity that was equivalent to the activity of the original catalyst after the latter had been on oil for the same amount of time. After 43 hours on oil, the rejuvenated catalyst was found to have an activity that was equivalent to 81% of the activity of the original catalyst after the latter had been on oil for the same period of time.

Example II

Another portion of the regenerated catalyst which was obtained in Example I was treated with concentrated nitric acid at atmospheric pressure and at a temperature of about 75° F. Only enough of the 16 N acid was used to wet the catalyst; that is, enough was used to fill the pore volume of the catalyst. Then the catalyst was dried at 212° F. and subsequently calcined in air at atmospheric pressure and 1000° F. for four hours. The rate of air used was about one cubic foot per hour. The calcined catalyst was treated for one hour at a pressure of 83 atmospheres and a temperature of 750° F. with hydrogen. Hydrogen was passed over the catalyst at the rate of about one cubic foot per hour. The catalyst which had received the above sequence of treatments was tested to obtain a determination of its hydrocracking activity. This activity test was conducted at nominal conditions similar to those used in Example I. After 50 hours on oil, the activity of this rejuvenated catalyst was found to be 96% of the activity that the original catalyst had after the latter had been on oil for the same period of time. The rejuvenated catalyst was shown to have nickel crystallites which were smaller than those that can be measured accurately by X-ray-diffraction techniques.

In each of the above examples, the catalyst which prior to the particular rejuvenation treatment had nickel crystallites ranging from about 500 A. to about 1000 A. was converted to a catalyst which had nickel crystallites which were smaller than those that can be measured accurately. These examples, which demonstrate the feasibility of my invention and suggest its usefulness, are presented for descriptive purposes only and are not intended to limit the scope of my invention.

I claim:

1. A process for the rejuvenation of a catalyst comprising arsenided-nickel on fluorided-silica-alumina, said catalyst having been used for the conversion of hydrocarbons until the crystallites of said nickel have grown to a size which renders the catalyst substantially ineffective for the conversion of hydrocarbons and said catalyst having had a major portion of the coke removed therefrom, said process comprising in sequence: treating said catalyst with a nitrogen-oxide-affording material at conditions effective to cause said material to react with said nickel, said nitrogen-oxide-affording material being a member selected from the group consisting of concentrated nitric acid and a gas containing at least one member selected from the group consisting of NO, $NO_2$, $N_2O$, and $N_2O_3$; treating said catalyst with an oxygen-containing gas at conditions effective to cause the oxygen of said oxygen-containing gas to react with said nickel; and treating said catalyst with a hydrogen-containing gas at conditions effective to cause the hydrogen of said hydrogen-containing gas to reduce said nickel.

2. The process of claim 1 wherein said treating said catalyst with a nitrogen-oxide-affording material comprises treating said catalyst with a gas containing at least one member selected from the group consisting of NO, $NO_2$, $N_2O$, and $N_2O_3$ at a temperature within the range of about 500° to about 1100° F., a pressure within the range of about 0.5 to about 10 atmospheres, and a gas flow rate within the range of about 0.25 to about 5.0 cubic feet per hour for a period of time within the range of about 0.5 to about 16 hours, the concentration of said member in said gas being at least 25 volume percent, said concentration, said temperature, said pressure, said gas flow rate, and said period of time all being selected to effectively cause said member to react with said nickel.

3. The process of claim 1 wherein said treating said catalyst with a nitrogen-oxide-affording material comprises: treating said catalyst with an amount of concentrated nitric acid sufficient to merely fill the available pore volume of said catalyst at a temperature within the range of about 45° to about 160° F. and a pressure within the range of about 1 to about 5 atmospheres for a time sufficient to permit nitric acid to fill the available pore volume of the catalyst; and drying said catalyst in air at a temperature within the range of about 200° to about 300° F. and at a pressure within the range of about 1 to about 5 atmospheres for a period of time within the range of about 2 to about 16 hours.

4. The process of claim 2 wherein said treating said catalyst with an oxygen-containing gas comprises treating said catalyst with a gas containing oxygen at a temperature of at least 500° F., a pressure of at least 0.5 atmosphere, an oxygen flow rate of at least 0.25 cubic feet per hour for a period of time of at least 0.5 hour, the concentration of oxygen in said gas being at least 2 volume percent, said temperature, said pressure, said flow rate, period of time, and said concentration, all being selected to effectively cause said oxygen to react with said nickel.

5. The process of claim 3 wherein said treating said catalyst with an oxygen-containing gas comprises treating said catalyst with a gas containing oxygen at a temperature within the range of about 500° to about 1100° F., a pressure within the range of about 0.5 to about 80 atmospheres, and a flow rate within the range of about 0.25 to about 5.0 cubic feet per hour for a period of time within the range of about 0.5 to about 10 hours, the concentration of oxygen in said gas being at least 2 volume percent, said temperature, said pressure, said flow rate, said period of time, and said concentration, all being selected to effectively cause said oxygen to react with said nickel.

6. The process of claim 4 wherein said treating said catalyst with a hydrogen-containing gas comprises treating said catalyst with a gas containing hydrogen at a hydrogen concentration of at least 60 volume percent at a temperature of at least 400° F., a pressure of at least 69 atmospheres, and a hydrogen flow rate of at least 0.25 cubic feet per hour for a period of time of at least 0.5 hour, said hydrogen concentration, said temperature, said pressure, said hydrogen flow rate, and said period of time, all being selected to effectively cause said hydrogen to reduce said nickel.

7. The process of claim 5 wherein said treating said catalyst with a hydrogen-containing gas comprises treating said catalyst with a gas containing hydrogen at a hydrogen concentration of at least 60 volume percent at a temperature within the range of about 400° to about 1000° F., a pressure within the range of about 69 to about 110 atmospheres, and a hydrogen flow rate within the range of about 0.25 to about 5.0 cubic feet per hour for a period of time within the range of about 0.5 to about 10 hours, said hydrogen concentration, said temperature, said pressure, said hydrogen flow rate, and said period of time, all being selected to effectively cause said hydrogen to reduce said nickel.

8. A process for the rejuvenation of a deactivated arsenided-nickel-on-fluorided-silica-alumina catalyst, said catalyst having been used for the conversion of hydrocarbons until the crystallites of nickel have grown to a size which renders the catalyst substantially ineffective for the conversion of hydrocarbons and said catalyst having had a major portion of the coke removed therefrom, said process comprising in sequence: treating said catalyst with a gas containing at least one member selected from the group consisting of NO, $NO_2$, $N_2O$ and $N_2O_3$ at a member concentration of at least 25 volume percent at a temperature within the range of about 700° to about 900° F., a pressure within the range of about 1 to about 3 atmospheres, and a gas flow rate within the range of about 0.5 to about 2.0 cubic feet per hour for a period of time within the range of about 4 to about 16 hours, said member concentration, said temperature, said pressure, said gas flow rate, and said period of time, all being selected to effectively cause said member to react with said nickel; treating said catalyst in air at a temperature within the range of about 900° to about 1100° F., a pressure within the range of about 1 to about 10 atmospheres, and an air flow rate within the range of about 0.5 to about 3.0 cubic feet per hour for a period of time within the range of about 1 to about 6 hours, said temperature, said pressure, said flow rate, and said period of time all being selected to effectively cause said air to react with said nickel; and treating said catalyst with a gas containing hydrogen at a hydrogen concentration of at least 60 volume percent at a temperature within the range of about 700° to about 900° F., a pressure within the range of about 90 to about 103 atmospheres, and a hydrogen flow rate within the range of about 0.5 to about 2.0 cubic feet per hour for a period of time within the range of about 1 to about 6 hours, said hydrogen concentration, said temperature, said pressure, said hydrogen flow rate, and said period of time, all being selected to effectively cause said hydrogen to reduce said nickel.

References Cited

UNITED STATES PATENTS

| | | | |
|---|---|---|---|
| 2,963,449 | 12/1960 | Nixon | 252—411 X |
| 3,156,737 | 10/1964 | Gatberlet | 252—456 X |
| 3,175,983 | 5/1965 | Mooi et al. | 252—419 X |
| 3,252,918 | 5/1966 | Disegna et al. | 252—419 X |

DANIEL E. WYMAN, *Primary Examiner.*

C. F. DEES, *Assistant Examiner.*

U.S. Cl. X.R.

252—413, 419